United States Patent [19]
Dawson

[11] Patent Number: 5,974,059
[45] Date of Patent: Oct. 26, 1999

[54] FREQUENCY DOUBLED FIBER LASER

[75] Inventor: Jay W. Dawson, Austin, Tex.

[73] Assignee: 3M Innovative Properties Company, St. Paul, Minn.

[21] Appl. No.: 08/811,183

[22] Filed: Mar. 4, 1997

[51] Int. Cl.[6] .................................................. H01S 3/30
[52] U.S. Cl. .............................. 372/6; 372/20; 372/22; 372/32; 372/102
[58] Field of Search .................................. 372/6, 20, 22, 372/32, 92, 102

[56] References Cited

U.S. PATENT DOCUMENTS

| | | | |
|---|---|---|---|
| 3,808,549 | 4/1974 | Maurer | 331/94.5 |
| 4,739,507 | 4/1988 | Byer et al. | 372/22 |
| 4,764,933 | 8/1988 | Kozlovsky et al. | 372/40 |
| 4,815,079 | 3/1989 | Snitzer et al. | 372/6 |
| 4,829,529 | 5/1989 | Kafka | 372/6 |
| 5,027,361 | 6/1991 | Kozlovsky et al. | 372/22 |
| 5,077,748 | 12/1991 | Kozlovsky et al. | 372/22 |
| 5,305,335 | 4/1994 | Ball et al. | 372/6 |
| 5,373,576 | 12/1994 | Minns et al. | 385/125 |
| 5,418,802 | 5/1995 | Chwalek | 372/20 |
| 5,473,622 | 12/1995 | Grubb | 372/6 |
| 5,504,771 | 4/1996 | Vahala et al. | 372/94 |
| 5,790,722 | 8/1998 | Minden et al. | 372/6 |

FOREIGN PATENT DOCUMENTS

| | | | |
|---|---|---|---|
| 0 585 758 A1 | 3/1994 | European Pat. Off. | H01S 3/133 |
| WO 96/10854 | 4/1996 | WIPO | H01S 3/06 |

OTHER PUBLICATIONS

Ball et al., "Low Noise Single Frequency Linear Fibre Laser", *Electronics Letters*, 2nd Sep. 1993, vol. 29, No. 18, pp. 1623–1625.

Nelson et al., "Efficient Frequency Doubling of a Femtosecond Fiber Laser", *Optics Letters*, Nov. 1, 1996, vol. 21, No. 21, pp. 1759–1761.

Alcock, et al., "Tunable, continuous–wave neodymium––doped monomode–fiber laser operating at 0.900–0.945 and 1.070–1.135 $\mu$m," *Optics Letters*, 11:709–711, Nov. 1986.

Ashkin et al., "Resonant Optical Second Harmonic Generation and Mixing," *IEEE Journal of Quantum Electronics*, QE–2:109–124, Jun. 1966.

Ball, et al., "60 mW 1.5 $\mu$m Single–Frequency Low–Noise Fiber Laser MOPA," *IEEE Photonics Technology Letters*, 6:192–194, Feb. 1994.

Ball, G.A. and W.H. Glenn, "Design of a Single–Mode Linear–Cavity Erbium Fiber Laser Utilizing Bragg Reflectors," *Journal of Lightwave Technology*, 10:1338–1343, Oct. 1992.

*Primary Examiner*—James W. Davie
*Attorney, Agent, or Firm*—Néstor F. Ho; H. Dale Langley, Jr.

[57] ABSTRACT

A system for lasing includes a diode laser array for emitting light of wavelength $\lambda_0$, a tunable Bragg grating fiber laser connected to the diode laser array for emitting single mode light of wavelength $2*\lambda_{vis}$, a cladding pumped power amplifier connected to the diode laser array and the tunable Bragg grating fiber laser, and a second harmonic generator, including an optical cavity and crystal, connected to the cladding pumped power amplifier for emitting light of wavelength $\lambda_{vis}$. The second harmonic generator is maximized, thereby maximizing emission of the light of wavelength $\lambda_{vis}$, by control electronics connected to the tunable Bragg grating fiber laser, the cladding pumped power amplifier, and the second harmonic generator. The control electronics stabilize the amplitude of the light of wavelength $2*\lambda_{vis}$, emitted by the tunable Bragg grating fiber laser and lock the frequency of the light of wavelength $2*\lambda_{vis}$ to the optical cavity resonance.

22 Claims, 2 Drawing Sheets

Ball, G.A. and W.W. Morey, "Efficient Integrated Nd$^{3+}$ Fiber Laser," *IEEE Transactions Technology Letters*, 3:1077–1078, Dec. 1991.

Gerstenberger, et al., "Efficient second–harmonic conversion of cw single–frequency Nd:YAG laser light by frequent locking to a monolithic ring frequency doubler," *Optics Letters*, 16:992–994, Jul. 1, 1991.

Kozlovsky, et al., "Second–harmonic generation of a continous–wave diode–pumped Nd:YAG laser using an externally resonant cavity," *Optics Letters*, 12:1014–1016, Dec. 1987.

Zellmer, et al., "High–power cw neodymium–doped fiber laser operating at 9.2 W with high beam quality," *Optics Letters*, 20:578–580, Mar. 15, 1995.

FREQUENCY DOUBLED FIBER LASER

BACKGROUND OF THE INVENTION

The invention generally relates to fiber lasers and, more particularly, relates to architectures of frequency doubled, solid state fiber lasers suitable for visual display applications.

Various lasers and their applications are generally conventional. Low-power lasers have been used, for example, for reading such matters as bar codes and compact disks, for writing in such devices as computer printers and newspaper platemakers, for communicating between computing, telecommunication, and other communications devices, for measuring distances and time, in diagnosing and analyzing chemical and medical conditions and characteristics, and for other purposes. High-power lasers have also been used for many purposes, such as in cutting, welding, drilling and working with materials, in treating various medical conditions involving surgical techniques, in reacting photochemicals and separating isotopes, in driving nuclear fusion processes, and in various other respects.

Although lasers have had varied application, lasers have not typically been employed in common visual display applications. In such applications, the usual practice has been to use electric light bulb, lens, and/or reflective technologies. These conventional technologies have presented problems of thermal heating of components, high power consumption, inefficient light projection, and limited color tone distinction, among others. Lasers have not typically been employed in display applications because the available laser systems useable in those applications have been large, expensive, inefficient, ineffective, and otherwise unsuitable.

Therefore, what is needed is a laser system for application in visual display devices, which system has an architecture that overcomes many of the disadvantages of the prior laser and conventional display technologies.

SUMMARY OF THE INVENTION

Embodiments of the present invention, accordingly, overcome these and other disadvantages and problems of the prior visual display technologies, both electric light bulb and laser. In addition, the present invention provides additional advantages of greater permissible wavelength variation of diode lasers, improved laser spatial effects and thus increased brightness, and increased failure tolerance of diode laser arrays. Further advantages of the invention include reduced thermal effects, the possibility of inherent control of optical polarization state via appropriate waveguide design, increased system robustness as a result of minimization of optical alignment constraints because of an all fiber design, and other advantages.

To this end, one embodiment of the invention is a system for lasing. The system includes a diode laser array for emitting light of wavelength $\lambda_0$, a tunable Bragg grating fiber laser connected to the diode laser array for emitting single mode light of wavelength $2*\lambda_{vis}$, a cladding pumped power amplifier connected to the diode laser array and the tunable Bragg grating fiber laser, and a second harmonic generator, including an optical cavity having an optical cavity resonance, connected to the cladding pumped power amplifier for emitting light of wavelength $\lambda_{vis}$. The power through the second harmonic generator is maximized, thereby maximizing emission of the light of wavelength $\lambda_{vis}$, where 400 nm $<\lambda_{vis}<$ 800 nm.

Another embodiment of the invention is control electronics for controlling a laser system. The control electronics include a first photodetector, connected to the laser system, for detecting the light of wavelength $2*\lambda_{vis}$ and converting the light to a first electric current, a proportional-differential-integral control circuit, connected to the first photodetector, for receiving the first electric current and outputting first control signals to the laser system, a second photodetector, connected to the laser system, for detecting the light of wavelength $2*\lambda_{vis}$ emitted by the second harmonic generator and converting the light to a second electric current, a demodulating circuit, connected to the second photodetector, for demodulating the second electric current, a proportional-integral-differential control circuit, connected to the demodulating circuit and the laser system, for receiving the second electric current, as demodulated, and outputting second control signals to the laser system.

Yet another embodiment of the invention is a method of lasing. The method of lasing includes steps of emitting light of wavelength $\lambda_0$, passing a first portion of the emitted light to a tunable fiber laser, passing a second portion of the emitted light to a power amplifier, tuning the tunable fiber laser to emit single lasing mode light of wavelength $2*\lambda_{vis}$, emitting single lasing mode light of wavelength $2*\lambda_{vis}$ by the tunable fiber laser, propagating the single lasing mode light through a core of a clad optical fiber, propagating the second portion of the emitted light through a cladding of the clad optical fiber, mode matching the light propagated through the clad optical fiber to a resonance of an optical cavity, and emitting a laser beam by a crystal within the optical cavity.

Another embodiment of the invention is a lasing system. The lasing system comprises means for emitting light of wavelength $\lambda_0$, a tunable fiber laser connected to the means for emitting light, for receiving a first portion of the emitted light, a power amplifier connected to the means for emitting light, for receiving a second portion of the emitted light, means, connected to the tunable fiber laser, for tuning the tunable fiber laser to emit single lasing mode light of wavelength $2*\lambda_{vis}$, an optical fiber having a core and a clad, connected to the tunable fiber laser and the means for emitting, for propagating the single lasing mode light through the core and propagating the second portion of the emitted light through the clad, a second harmonic generator, connected to the optical fiber, including an optical cavity of a resonance and a crystal in the optical cavity, means, connected to the optical fiber, for mode matching the light propagated through the optical fiber to the resonance of the optical cavity. The crystal emits a laser beam.

Yet another embodiment of the invention is a device for tuning a tunable Bragg grating fiber laser. The device includes a piezoelectric piece and means connected to the piezoelectric piece, for selectively varying a voltage applied to the piezoelectric piece.

Another embodiment of the invention is a method for tuning a tunable Bragg grating fiber laser. The method includes the step of selectively varying a voltage applied to a piezoelectric piece.

DETAILED DESCRIPTION OF THE PREFERRED EMBODIMENT

Figure 1:
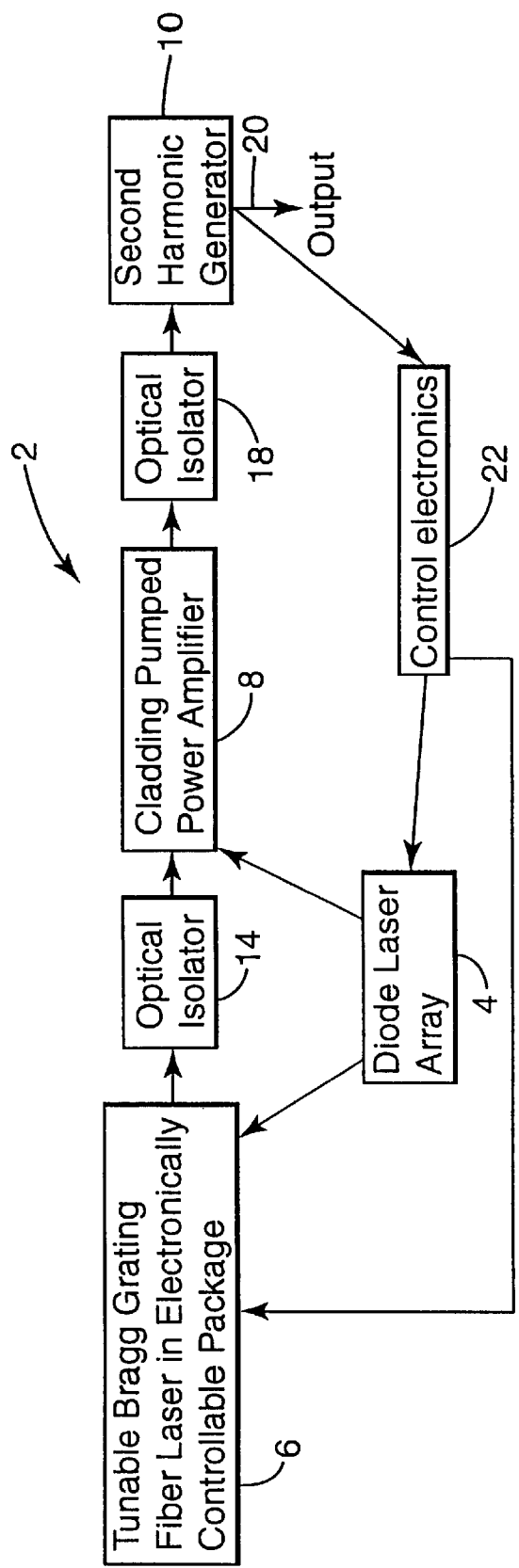
FIG. 1 is a block diagram of an architecture of a frequency doubled diode pumped solid state fiber laser for producing coherent visible light sources, which may be employed in visual displays and other applications, according to embodiments of the present invention.

Referring to FIG. 1, a basic architecture of a frequency doubled fiber laser system 2 includes four subsystems: a diode laser array 4, a tunable Bragg grating fiber laser 6, a cladding pumped power amplifier 8, and a second harmonic generator 10. The output of the diode laser array 4 is connected to the tunable Bragg grating fiber laser 6. The output of the diode laser array 4 is also connected to the cladding pumped power amplifier 8. The tunable Bragg grating fiber laser 6 is connected to the cladding pumped power amplifier 8. The output of the tunable Bragg grating fiber laser 6 passes to an optical isolator 14 and, then, to the cladding pumped power amplifier 8. The output of the cladding pumped power amplifier 8 passes to an optical isolator 18, and from the optical isolator 18 to the second harmonic generator 10. The second harmonic generator outputs a light beam 20 for visual display. The frequency doubled fiber laser system 2 is controlled by control electronics 22 connected to the tunable Bragg grating fiber laser 6, the cladding pumped power amplifier 8, and the second harmonic generator 10.

The diode laser array 4 provides energy of wavelength $\lambda_0$ to the system 2. The wavelength $\lambda_0$ is an absorption wavelength of a rare earth ion used in a photosystem optical fiber employed in the tunable Bragg grating fiber laser 6 and the cladding pumped power amplifier 8. This optical fiber is a silica fiber that is doped with a rare earth ion in the manufacturing process. The rare earth ion is Neodymium ($Nd^{3+}$), or any other suitable rare earth ion, such as, for example, Er, Yb, Pr, Er/Yb, or others. Optical fibers so doped with rare earth ion, and their manufacture, are conventional. The light beam 20 output by the second harmonic generator 10 (and, thus, the output by the frequency doubled fiber laser system 2) has wavelength $\lambda_{vis}$. For purposes of the description here, it is assumed that $\lambda_0 < 2*\lambda_{vis}$. In the present invention, $\lambda_0$ can generally be permitted to vary as much as about +/−10 nm. In comparison, $\lambda_0$ in conventional bulk optic crystal lasers must be constrained to about +/−1 nm variation.

The Diode Laser Array:

The diode laser array 4 is a conventional array of high power laser diodes. The diode laser array 4 has an output power, for example, in the range of from about 2 W to about 20 W. The wavelength of energy output by the diode laser array 4 may, for example, vary from about 798 nm to about 818 nm. Of course, these are merely examples of output power and wavelength of the diode laser array 4 that are suitable in the system 2 for employment in certain visual display devices. Other output powers and wavelengths may be employed in appropriate situations and other applications.

The Tunable Bragg Grating Fiber Laser:

The tunable Bragg grating fiber laser 6 is connected to a single element of the diode laser array 4 at the unused end of the fiber laser 6. The tunable Bragg grating fiber laser 6 is conventional. The tunable Bragg grating fiber laser 6 includes a piece of the photosensitive, rare earth doped optical fiber previously described. The optical fiber has Bragg gratings written in the core of the fiber. The Bragg gratings are written in the core of the optical fiber in such a manner as to form a single frequency laser cavity at $2*\lambda_{vis}$. If the optical fiber is doped with a high concentration of Neodymium as the rare earth ion, a 1.8 cm long laser cavity is written with Lw light. In such a case, about 0.3 cm of the laser 6 in the center is unaffected by the UV light and forms the "cavity". Other portions of the optical fiber of the laser 6 are written with standard Bragg gratings of sufficiently high reflectivity to provide gain sufficient to exceed the transmission of the mirror of the laser 6, for example, the gratings may have a reflection band of less than about 0.1 nm centered at 1064 nm (for a laser that is doubled to 532 nm, i.e., green) or 930 nm (for a laser that is doubled to 465nm, i.e., blue). For purposes of the remainder of the description herein, only the 1064nm wavelength is discussed. It is intended that it be understood, however, that the same principles apply with respect to the design and configuration of the system 2 for outputs of wavelength other than 1064 nm and those skilled in the art will know and appreciate the variations in specifications necessary to achieve such other outputs.

Tuning of the tunable Bragg grating fiber laser 6 is provided by stretching the optical fiber. Although conventional tuning mechanisms may be employed, a particularly effective tuning mechanism is a piezoelectric tuning device. With respect to the piezoelectric tuning device, the optical fiber of the tunable Bragg grating fiber laser 6 is mounted to a piece of piezoelectric material. The piezoelectric material is equipped for supply thereto of a controlled voltage. The controlled voltage is selectively varied to cause the piezoelectric material to move, thereby selectively straining or relieving tension on the optical fiber to respectively stretch or compress the fiber. The stretching and compressing of the optical fiber effects tuning of the fiber laser 6 in a typical manner.

The optical isolator 14 connected to the output of the tunable Bragg grating fiber laser 6 is conventional. For example, a suitable optical isolator 14 is a polarization independent model such as Model No. IO-F-FFB-1064-Y, available from Optics for Research, Caldwell, N.J. In addition to the optical isolator 14, one or more bandpass filters may be, but are not necessarily, connected to the output of the tunable Bragg grating fiber laser 6 prior to the optical isolator 14 or to the output of the optical isolator 14. An appropriate optical bandpass filter for use with the system 2 is centered at $2*\lambda_{vis}$.

The Cladding Pumped Power Amplifier:

The cladding pumped power amplifier 8 is connected to the other elements of the diode laser array 4 not connected to the tunable Bragg grating fiber laser 6 and also to the output of the tunable Bragg grating fiber laser 6. The cladding pumped power amplifier 8 includes a piece of a double clad rare earth doped optical fiber. The core of the optical fiber is single mode at $2*\lambda_{vis}$, and the cladding nearest the core of the fiber forms a multimode waveguide for pump light from the diode laser array 4. The output light from the tunable Bragg grating fiber laser 6, after passing through the optical isolator 14 and, if applicable, any bandpass filters, is coupled into the single mode core of the double clad rare earth doped optical fiber at one end of the fiber. The output light from the elements of the diode laser array 4 not connected to the tunable Bragg grating fiber laser 6 are coupled to the cladding layer nearest the core of the double clad rare earth doped optical fiber. The double clad rare earth doped optical fiber and the particular techniques for the couplings to the core and to the cladding layer nearest the core are conventional, for example, the coupling to the cladding may be by the method of Goldberg, L., et al., "High efficiency side coupling of light into double cladding fibers using imbedded v-grooves", OFC Conference Proceeding (1996).

An optical isolator 18 is connected to the output of the cladding pumped power amplifier 8. The optical isolator 18 is conventional. For example, a suitable optical isolator 18 is Model No. IO-F-FFB-1064-Y-Z, available from Optics for Research.

The Second Harmonic Generator:

The second harmonic generator 10, connected to the output of the cladding pumped power amplifier 8 (i.e., after passing through the optical isolator 14), includes an optical cavity containing a type I non-linear optical crystal. The optical crystal is phase matched for second harmonic generation at $2*\lambda_{vis}$. For example, prior to passing to the second harmonic generator 10, a series of lenses (not shown), as is typical, mode matches the output of the cladding pumped power amplifier 8 to the spatial mode of the optical cavity containing the optical crystal. In the case of the 1064 nm wavelength referred to herein as an example only, the optical cavity is about 1 cm long and the optical crystal contained in the cavity measures 1 cm long. Also in this instance, the optical crystal is an LBO crystal that is temperature tuned to be non-critically phase matched for frequency doubling 1064 nm light. The optical crystal of the second harmonic generator 10 is ground and polished. Further, the optical crystal has dielectric mirrors coated on the end faces thereof to form a stable optical resonator. Reflectivities of the dielectric mirrors are set so as to optimize reflectivities for frequency doubling, for example, as set forth in Kozlovsky, W. J., et al., "Second-harmonic generation of a continuous-wave diode pumped Nd:YAG laser using an externally resonant cavity", 12 Optics Letters 1014-1016 (1987).

The Control Electronics:

The control electronics 22 are connected to the tunable Bragg grating fiber laser 6, the diode laser array 4, and the second harmonic generator 10. The control electronics 22 include a first photodetector for converting optical power to a first electrical current; a proportional-differential-integral (PDI) control circuit connected to the first photodetector, with feedback of the PDI control circuit connected to the diode laser array 4; a second photodetector for converting optical power to a second electrical current; a circuit, connected to the second photodetector, for demodulating the second electrical current by comparing it to a reference sinusoidal oscillation; and a proportional-integral-differential (PID) control circuit connected to the second photodetector for receiving the demodulated second electrical current, with feedback of the PID control circuit connected to the tuning mechanism, for example, the PZT with controlled voltage supply, of the tunable Bragg grating fiber laser 6.

Regarding the connections of the control electronics 22 to the rest of the system 2, the first photodetector is connected to the tunable Bragg grating fiber laser 6 in such a manner as to cause a small amount of light to be diverted from the output of the tunable Bragg grating fiber laser 6. This diverted light is passed to the photodetector, where the optical power of the diverted light is converted to the first electrical current. The second photodetector is connected to the second harmonic generator 10 in such a manner as to cause a small amount of light to be diverted from the output 20 of the second harmonic generator to the second photodetector. At the second photodetector, the particular diverted light is converted to the second electrical current.

Operation of the System:

In operation, the frequency doubled fiber laser system 2 provides a reliable, robust, and coherent visible light source. In a step 100 of operation of the system 2, the diode laser array 4 emits energy of the wavelength $\lambda_o$. In a step 102, the energy of a single one of the elements of the diode laser array 4 is passed as input to the tunable Bragg grating fiber laser 6. The energy of the other elements of the diode laser array 4 is passed, in a step 104, to the cladding pumped power amplifier 8. The energy is so passed to the cladding layer of the amplifier 8 nearest the core of the double clad rare earth ion doped optical fiber of the amplifier 8.

At the tunable Bragg grating fiber laser 6, absorption of energy in the form of pump photons from the single element of the diode laser array 4 excites the rare earth ions in the core of the optical fiber of the fiber laser 6. The energy absorbed from the pump photons is then emitted, in a step 105, in a single lasing mode because of the physical interaction of the Bragg gratings of the optical fiber and the rare earth ions in the fiber core. This fiber laser 6 is tuned in a step 106, that is, the wavelength of the single mode output of the laser 6 is adjusted, for example, by temperature tuning or strain tuning (such as by use of PZT) of the laser 6 as previously mentioned. The tunable Bragg grating fiber laser 6 outputs a low power, tunable, single frequency laser emission of a wavelength of $2*\lambda_{vis}$. Under the exemplary specifications for the system 2 which have been addressed herein, gains of about 0.2 dB/cm are obtainable.

The single mode light output of the tunable Bragg grating fiber laser 6 is optically isolated by the optical isolator 14 in a step 108. As previously mentioned, additional steps of filtering either before or after the output passes through the optical isolator 14 may be, but are not necessarily, performed. The filtering may improve system 2 performance by minimizing stimulated emission of power at wavelengths other than the wavelength of laser emission. The light output is then passed to the cladding pumped power amplifier 8.

Figure 2:
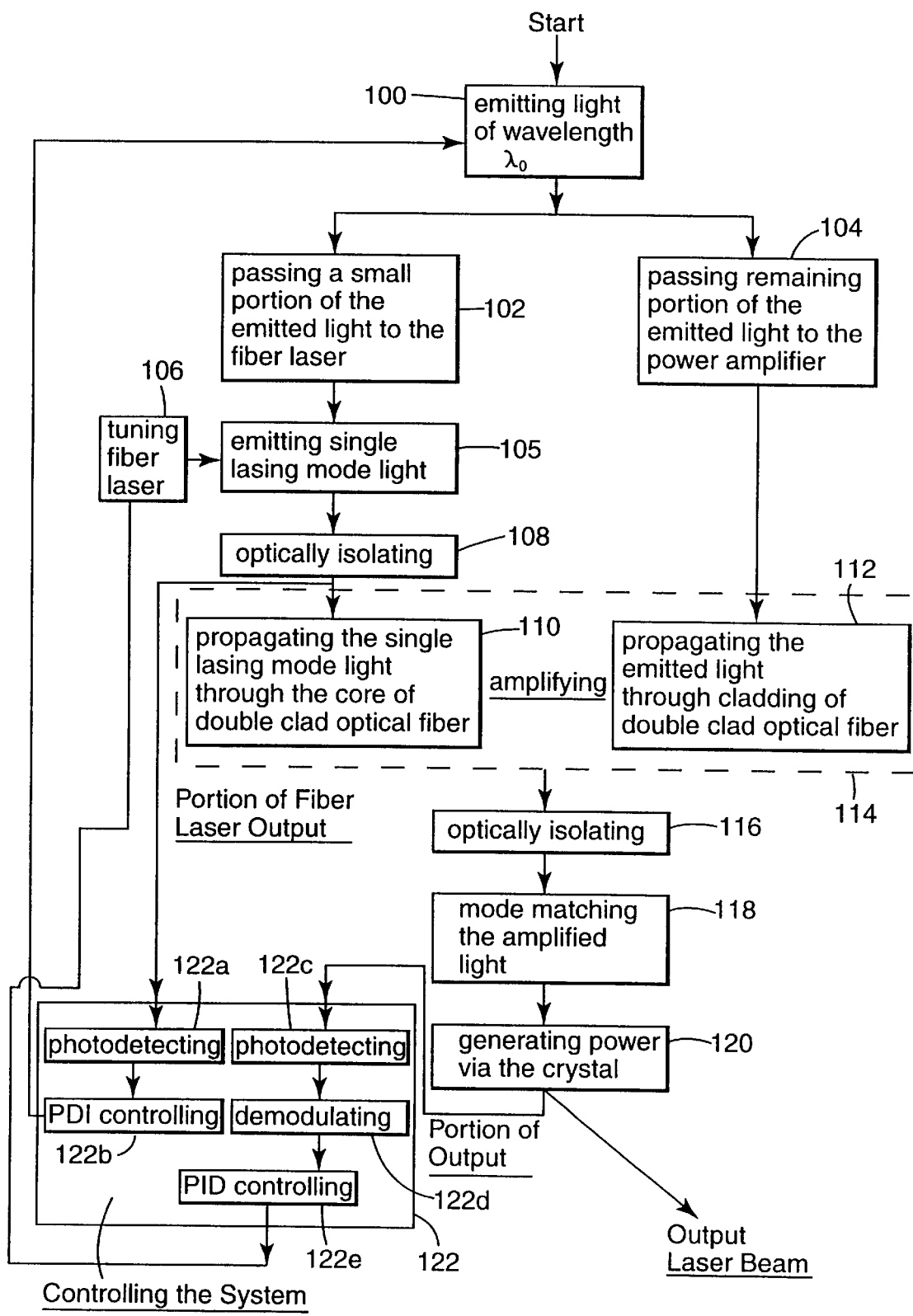
FIG. 2 is a flow diagram of the operations of the frequency doubled diode pumped solid state fiber laser of the architecture of FIG. 1, according to embodiments of the present invention.

At the cladding pumped power amplifier 8, the light output is propagated, in a step 110, in the core of the double clad optical fiber of the cladding pumped power amplifier 8. At the same time, in a step 112, the light emitted by the diode laser array 4 that is not passed to the tunable Bragg grating fiber laser 6 is propagated through the cladding layer nearest the core of the double clad optical fiber of the cladding pumped power amplifier 8. The laser light is so amplified, identified as step 114 (i.e., the combined steps 110 and 112) in FIG. 2, by the cladding pumped power amplifier 8. The light from the diode laser array 4 to the power amplifier 8 effectively side pumps the core of the single mode rare earth doped optical fiber. As laser light in the core propagates in the step 110 along the length of the optical fiber, the light is amplified 114 to high power levels while retaining the essential frequency characteristics of the tunable Bragg grating fiber laser (i.e., the master oscillator). The amplified laser output is emitted in a single spatial mode at the output end of the double clad rare earth doped optical fiber. The cladding pumped power amplifier 8, thusly, permits efficient conversion of the low-brightness, broad spectrum optical energy from the diode laser array 4 into the high brightness (single spatial mode), narrow spectrum laser light amplified output. The amplification achieved by the power amplifier 8 is on the order of about 3–4 watts for the exemplary specification.

The amplified output of the cladding pumped power amplifier 8 is optically isolated by the optical isolator 18 in a step 116.

The amplified output is then mode matched in a step 118. The mode matching of the step 118 is achieved by the series of lenses. The series of lenses matches the mode of the amplified output (i.e., focuses it) to the spatial mode of the optical cavity containing the LBO crystal of the second harmonic generator 10.

The crystal of the second harmonic generator 10, as previously mentioned, is temperature tuned to be non-critically phase matched for frequency doubling. When the wavelength of the amplified output is precisely matched, for example, by the control electronics 22 (as hereinafter more fully described), to a resonance of the optical cavity of the second harmonic generator 10, the power circulating in the optical cavity and thus through the crystal at $2*\lambda_{vis}$ is maximized. This in turn maximizes the power emitted by the crystal at $\lambda_{vis}$, which is generated in a step 120 from the power at $2*\lambda_{vis}$ via non-linear interaction in the crystal. The power emitted by the crystal is the laser light produced by the system 2.

The operation of the system 2 is controlled in a step 122 by the control electronics 22. In the step 122, the control electronics 22 stabilize the amplitude of the laser light from the system 2 at $2*\lambda_{vis}$ and lock the laser light frequency to the resonance of the optical cavity. The control electronics 22 operate by photodetecting, in a step 122a, a small amount of the light output from the step of emitting 105 by the tunable Bragg grating fiber laser 6. The power of the small amount of light output is converted to electrical current in the step 122a. In a step 122b, the electrical current from the step 122a is proportionally-differentially-integrally (PDI) controlled and feedback of the PDI controlling is passed to the diode laser array 4 for pumping the tunable Bragg grating fiber laser 6 to stabilize the intensity of the output of the fiber laser 6.

Further in the step 122, the step 122b imposes a sinusoidal oscillation on the wavelength of the output of the fiber laser 6. That sinusoidal oscillation is converted to intensity fluctuations at the oscillation frequency (and harmonics thereof) as the light is passed through the optical cavity of the second harmonic generator 10. To achieve the conversion, a small amount of the laser output of the system 2 by the crystal of the second harmonic generator 10 is photodetected in a step 122c and, thus, converted to electrical current. Intensity fluctuations in the electrical current (i.e., corresponding to intensity fluctuations of the laser output of the system 2) are demodulated, in a step 122d, by comparison of the electrical current to the reference sinusoidal oscillation. In a step 122e, the resulting intensity differences in the electrical current and the reference sinusoidal oscillation are proportionally-integrally-differentially (PID) controlled. Feedback of the PID controlling is passed to the step 106 of tuning the tunable Bragg grating fiber laser 6, thereby causing the tuning step 106 to lock the wavelength of the output of the fiber laser 6 of the emitting step 105 to the resonance of the optical cavity. The controlling step 122, thus, ensures the maximum power conversion of light at $2*\lambda_{vis}$ to light at $\lambda_{vis}$. In the instant of the exemplary specification yielding a green output power at about 532 nm of about 1–2 watts, the system 2 may be expected to provide doubling efficiencies of on the order of at least about 30%.

An example of the system 2 and its operation follows:

EXAMPLE

A single frequency fiber laser that is strain tuned was fabricated with the example specifications stated above. The laser was mounted between a stainless steel motion stage and a fixed point. The stage was a Polytec, PI Model P-772.10 voltage controlled stage. By moving the stage, the fiber laser was strained. The laser lases stability in a single frequency at 1064 nm. This was verified with monochrometer and a Fabry-Perot spectrum analyzer of sufficient resolution to detect adjacent laser modes.

The laser was pumped with 45 mW of 808 nm light generated by a laser diode obtained from SDL, Inc., of San Jose, Calif., part number SDL-5411-G1. The output of this diode was collimated and focused into the core of the Nd doped fiber. There was approximately 100 μW of single frequency laser power at the output of this fiber at 1064 nm.

The output was then spliced to the optical isolator. Another 2 m piece of Nd doped fiber was spliced to the output of the isolator. The opposite end of this fiber was fusion spliced to a Gould fused fiber coupler, distributed by Gould, Inc., of Millersville, Md., Gould Part Number 40-10600-00-26580). The fused fiber coupler acted as a wavelength division multiplexer.

The 810 nm port of this coupler was injected with light from a second laser diode similar to the other one. Light at 1064 nm emerging from the other port of the coupler was coupled to the second optical isolator. This portion of the system then functioned as a standard optical fiber amplifier. It was measured to have a small signal gain of 25 dB and a fully saturated output power of 10 mW. The output power measured from the output of the amplifier with the input being from the laser was 5 mW (i.e., the amplifier was not fully saturated).

The output of the second isolator was then fusion spliced to a 150 m piece of cladding pumpable fiber made by 3M, of St. Paul, Minn., Lot #622913. The light emitted from the opposite end of the cladding pumpable fiber was collimated. A dichroic mirror was employed to reflect pump light from a high power laser diode from High Power Devices, Inc. of New Brunswick, N.J., P/N HPD 1020-T03, back along the emission path and into the fiber cladding, while transmitting the 1064 nm light. As much as approximately 800 mW of 808 nm light may be coupled into the fiber in this manner, however, 60 mW of 1064 nm radiation emerged in the collimated output beam in the example.

The output beam light was then focused to a spot using a lens with a 20 cm focal length. A 12 mm long, angle phase matched LBO crystal, from Casix, Inc. of Monrovia, Calif., was placed at the location of the focused spot to convert the 1064 nm laser radiation to 532 nm laser radiation. The LBO crystal was contained in a confocal, Fabry-Penot cavity made from two 98% reflectivity (at 1064 nm), 5 cm radius of curvature, dielectric mirrors. The measured 532 nm power level was 200 μW, and the measured 532 nm power was proportional to the square of the measured 1064 nm power as expected. The fiber laser was frequency locked to the resonant cavity using control electronics fabricated at 3M.

Several variations of the system 2 and its operation are possible. For example, residual pump light that is not absorbed in the tunable Bragg grating fiber laser 6 can be collected by a longer length of Nd doped fiber and the output of the laser 6 would then be amplified by this fiber to a power level in the range of several milliwatts. Furthermore, an optical circulator can be employed in place of the optical isolator 14. This would provide advantages by placement of a dielectric mirror at the non-circulator end of the fiber. The mirror is designed to transmit pump light while reflecting laser light. This arrangement provides a convenient means of coupling in the pump light to the cladding pumped amplifier. The output is taken from the output of the circulator. This arrangement also eliminates the need for the optical isolator 14. Of course, other variations are possible.

Although illustrative embodiments of the invention have been shown and described, a wide range of modification, change, and substitution is contemplated in the foregoing disclosure and, in some instances, some features of the present invention may be employed without a corresponding use of the other features. Accordingly, it is appropriate that the appended claims be construed broadly and in a manner consistent with the scope of the invention.

What is claimed is:

1. A system for lasing, comprising:

a diode laser array for emitting light of wavelength $\lambda_o$;

a tunable Bragg grating fiber laser connected to the diode laser array for emitting single mode light of wavelength $2*\lambda_{vis}$;

a cladding pumped power amplifier connected to the diode laser array and the tunable Bragg grating fiber laser;

a second harmonic generator, including an optical cavity having an optical cavity resonance, connected to the cladding pumped power amplifier for emitting light of wavelength $\lambda_{vis}$; and control electronics coupled to detect output from the second harmonic generator and tune the Bragg grating fiber laser to match the optical cavity resonance thereby maximizing emission of the light of wavelength $1_{vis}$.

2. The system of claim 1, wherein the control electronics are connected to the tunable Bragg grating fiber laser, the diode laser array, and the second harmonic generator;

and further wherein the control electronics stabilize the amplitude of the light of wavelength $2*\lambda_{vis}$ emitted by the tunable Bragg grating fiber laser and lock the frequency of the light of wavelength $2*\lambda_{vis}$ to the optical cavity resonance.

3. The system of claim 2, further comprising a means for tuning the tunable Bragg grating fiber laser by straining and compressing.

4. The system of claim 3, wherein the means includes a piezoelectric material.

5. The system of claim 3, wherein the means is temperature dependent.

6. The system of claim 3, wherein the control electronics control the means for tuning and the diode laser array.

7. The system of claim 6, wherein the control electronics comprise:

a first photodetector, connected to the tunable Bragg grating fiber laser, for detecting the light of wavelength $2*\lambda_{vis}$ emitted by the tunable Bragg grating fiber laser and converting the light to a first electric current;

a proportional-differential-integral control circuit, connected to the first photodetector and to the means for tuning, for receiving the first electric current and outputting first control signals to the means for tuning.

8. The system of claim 6, wherein the control electronics comprise:

a second photodetector, connected to the second harmonic generator, for detecting the light of wavelength $2*\lambda_{vis}$ emitted by the second harmonic generator and converting the light to a second electric current;

a demodulating circuit, connected to the second photodetector, for demodulating the second electric current;

a proportional-integral-differential control circuit, connected to the demodulating circuit and the diode laser array, for receiving the second electric current, as demodulated, and outputting second control signals to the diode laser array.

9. The system of claim 7, further comprising:

a second photodetector, connected to the second harmonic generator, for detecting the light of wavelength $2*\lambda_{vis}$ emitted by the second harmonic generator and converting the light to a second electric current;

a demodulating circuit, connected to the second photodetector, for demodulating the second electric current;

a proportional-integral-differential control circuit, connected to the demodulating circuit and the diode laser array, for receiving the second electric current, as demodulated, and outputting second control signals to the diode laser array.

10. A method of lasing, comprising the steps of:

emitting light of wavelength $\lambda_o$;

passing a first portion of the emitted light to a tunable fiber laser;

passing a second portion of the emitted light to a power amplifier;

tuning the tunable fiber laser to emit single lasing mode light of wavelength $2*\lambda_{vis}$;

emitting single lasing mode light of wavelength $2*\lambda_{vis}$ by the tunable fiber laser;

propagating the single lasing mode light through a core of a clad optical fiber;

propagating the second portion of the emitted light through a cladding of the clad optical fiber;

mode matching the light propagated through the clad optical fiber to a resonance of an optical cavity; and emitting a laser beam by a crystal within the optical cavity.

11. The method of claim 10, further comprising the step of:

controlling an amplitude of the single lasing mode light to stabilize the amplitude to $2*\lambda_{vis}$ and to lock the frequency of the single lasing mode light to the resonance of the optical cavity.

12. The method of claim 11, wherein the step of controlling comprises the steps of:

photodetecting the single lasing mode light;

converting the detected single lasing mode light to a first electric current; and proportionally-differentially-integrally controlling the step of emitting light of wavelength $\lambda_o$ based on the first electric current.

13. The method of claim 11, wherein the step of controlling comprises the steps of:

photodetecting the laser beam;

converting the detected laser beam to a second electric current;

demodulating the second electric current by comparing the second electric current to a reference sinusoidal oscillation; and proportionally-integrally-differentially controlling the step of tuning based on the demodulated second electric current.

14. The method of claim 12, wherein the step of controlling comprises the steps of:

photodetecting the laser beam;

converting the detected laser beam to a second electric current;

demodulating the second electric current by comparing the second electric current to a reference sinusoidal oscillation; and proportionally-integrally-differentially controlling the step of tuning based on the demodulated second electric current.

15. A lasing system, comprising:

means for emitting light of wavelength $\lambda_0$;

a tunable fiber laser connected to the means for emitting light, for receiving a first portion of the emitted light;

a power amplifier connected to the means for emitting light, for receiving a second portion of the emitted light;

means, connected to the tunable fiber laser, for tuning the tunable fiber laser to emit single lasing mode light of wavelength $2*\lambda_{vis}$;

an optical fiber having a core and a clad, connected to the tunable fiber laser and the means for emitting, for propagating the single lasing mode light through the core and propagating the second portion of the emitted light through the clad;

a second harmonic generator, connected to the optical fiber, including an optical cavity of a resonance and a crystal in the optical cavity;

means, connected to the optical fiber, for mode matching the light propagated through the optical fiber to the resonance of the optical cavity;

wherein the crystal emits a laser beam.

16. The lasing system of claim 15, further comprising:

controls, connected to the tunable fiber laser, the means for emitting, and the second harmonic generator, for controlling an amplitude of the single lasing mode light to stabilize the amplitude to $2*\lambda_{vis}$ and to lock the frequency of the single lasing mode light to the resonance of the optical cavity.

17. The method of claim 16, wherein the controls comprise:

means for photodetecting the single lasing mode light, connected to the tunable fiber laser;

means for converting the detected single lasing mode light to a first electric current, connected to the means for photodetecting; and means for proportionally-differentially-integrally controlling the step of emitting light of wavelength $\lambda_0$ based on the first electric current, connected to the means for emitting.

18. The lasing system of claim 16, wherein the controls comprise:

means for photodetecting the laser beam, connected to the second harmonic generator;

means for converting the detected laser beam to a second electric current, connected to the means for photodetecting the laser beam;

means for demodulating the second electric current by comparing the second electric current to a reference sinusoidal oscillation, connected to the means for converting; and means for proportionally-integrally-differentially controlling the means for tuning based on the demodulated second electric current, connected to the means for proportionally-integrally-differentially controlling and the means for tuning.

19. The lasing system of claim 17, wherein the controls comprise:

means for photodetecting the laser beam, connected to the second harmonic generator;

means for converting the detected laser beam to a second electric current, connected to the means for photodetecting the laser beam;

means for demodulating the second electric current by comparing the second electric current to a reference sinusoidal oscillation, connected to the means for converting; and means for proportionally-integrally-differentially controlling the means for tuning based on the demodulated second electric current, connected to the means for proportionally-integrally-differentially controlling and the means for tuning.

20. The system of claim 15, wherein the crystal is selected from the group consisting of KTP, LBO, $LiNbO_3$ and $MgO:LiNbO_3$.

21. The system of claim 15, wherein $\lambda_{vis}$ is less than about 800 nm and greater than about 400 nm and $\lambda_0$ is less than about $2*\lambda_{vis}$.

22. The system of claim 15, wherein the means for tuning comprises a piezoelectric piece and means connected to the piezoelectric piece, for selectively varying a voltage applied to the piezoelectric piece.

* * * * *